(12) United States Patent
Jackson et al.

(10) Patent No.: US 8,397,765 B2
(45) Date of Patent: Mar. 19, 2013

(54) HIGH TEMPERATURE RESISTANT INSULATION FOR PIPE

(75) Inventors: Peter Jackson, Toronto (CA); Adam Jackson, Trondheim (NO); Eileen Wan, Richmond Hill (CA); Jan Peder Hegdal, Orkanger (NO)

(73) Assignee: ShawCor Ltd., Toronto (CA)

( * ) Notice: Subject to any disclaimer, the term of this patent is extended or adjusted under 35 U.S.C. 154(b) by 907 days.

(21) Appl. No.: 12/509,138

(22) Filed: Jul. 24, 2009

(65) Prior Publication Data

US 2010/0043906 A1    Feb. 25, 2010

Related U.S. Application Data

(60) Provisional application No. 61/083,726, filed on Jul. 25, 2008.

(51) Int. Cl.
*F16L 9/14* (2006.01)

(52) U.S. Cl. ...... 138/149; 138/137; 138/140; 428/36.91

(58) Field of Classification Search .................. 138/149, 138/137, 140, 141; 428/36.91, 36.9
See application file for complete search history.

(56) References Cited

U.S. PATENT DOCUMENTS

| | | | |
|---|---|---|---|
| 2,797,731 A | 7/1957 | Carlson, Jr. | |
| 3,477,891 A | 11/1969 | Hawerkamp | |
| 3,614,967 A | 10/1971 | Roylston | |
| 3,687,765 A | 8/1972 | MacLean et al. | |
| 3,731,710 A | 5/1973 | Bauer et al. | |
| 3,755,029 A | 8/1973 | Ellis et al. | |
| 3,916,953 A | 11/1975 | Nagayoshi et al. | |
| 3,929,166 A | 12/1975 | Westerheid | |
| 4,009,735 A * | 3/1977 | Pinsky | 138/147 |
| 4,162,093 A | 7/1979 | Sigmund | |
| 4,179,071 A * | 12/1979 | Kozacka | 239/397.5 |
| 4,345,042 A | 8/1982 | Kuroda et al. | |
| 4,377,186 A | 3/1983 | Genini et al. | |
| 4,380,486 A | 4/1983 | Fortsch et al. | |

(Continued)

FOREIGN PATENT DOCUMENTS

| | | |
|---|---|---|
| CA | 950818 | 7/1974 |
| CA | 1333653 | 12/1994 |

(Continued)

OTHER PUBLICATIONS

Therma-Coat, Therma-Coat Acrylic Insulating Primer Product Overview & Technical Specification, Web page, http://www.therma-coat.com/therma-coat-technical/therma-coat-technical-specification.pdf.

*Primary Examiner* — Patrick F Brinson
(74) *Attorney, Agent, or Firm* — DeLio & Peterson, LLC; Peter W. Peterson; Thomas Ciesco (57) ABSTRACT

A polymeric composition for insulating fluid and/or gas transport conduits, such as off-shore oil and gas pipelines operating at temperatures of 130° C. or higher in water depths above 1,000 meters. The outer surface of the conduit is provided with at least one layer of solid or foam insulation comprising a high temperature resistant thermoplastic having low thermal conductivity, high thermal softening point, high compressive strength and high compressive creep resistance. The high temperature resistant thermoplastic is selected from one or more members of the group comprising: polycarbonate; polyphenylene oxide; polyphenylene oxide blended with polypropylene, polystyrene or polyamide; polycarbonate blended with polybutylene terephthalate, polyethylene terephthalate, acrylonitrile butadiene styrene, acrylonitrile styrene acrylate, or polyetherimide; polyamides, including polyamide 12 and 612 and elastomers thereof; polymethylpentene and blends thereof; cyclic olefin copolymers and blends thereof; and, partially crosslinked thermoplastic elastomers, also known as thermoplastic vulcanizates or dynamically vulcanized elastomers.

34 Claims, 3 Drawing Sheets

U.S. PATENT DOCUMENTS

| | | | |
|---|---|---|---|
| 4,384,905 A | | 5/1983 | Gros |
| 4,458,723 A | | 7/1984 | Nojiri et al. |
| 4,478,253 A | * | 10/1984 | Everett .......................... 138/140 |
| 4,485,057 A | | 11/1984 | Kristensson et al. |
| 4,523,141 A | | 6/1985 | Thomas et al. |
| 4,549,581 A | | 10/1985 | Unno et al. |
| 4,589,275 A | | 5/1986 | Thomas et al. |
| 4,590,108 A | | 5/1986 | Nippe |
| 4,590,971 A | | 5/1986 | Webster et al. |
| 4,640,312 A | | 2/1987 | Patell et al. |
| 4,657,050 A | | 4/1987 | Patterson |
| 4,676,695 A | | 6/1987 | Duthweiler |
| 4,713,271 A | | 12/1987 | Searl et al. |
| 4,913,588 A | | 4/1990 | Vilnes |
| 5,026,451 A | | 6/1991 | Trzecieski et al. |
| 5,160,769 A | * | 11/1992 | Garrett .......................... 428/36.5 |
| 5,238,615 A | | 8/1993 | Stoor |
| 5,597,522 A | | 1/1997 | Curzon et al. |
| 5,869,591 A | | 2/1999 | McKay et al. |
| 5,934,335 A | | 8/1999 | Hardy |
| 5,996,643 A | | 12/1999 | Stonitsch |
| 6,019,137 A | | 2/2000 | Secher et al. |
| 6,058,979 A | | 5/2000 | Watkins |
| 6,065,781 A | | 5/2000 | Titus |
| 6,092,557 A | | 7/2000 | Sumner |
| 6,142,707 A | | 11/2000 | Bass et al. |
| 6,145,546 A | | 11/2000 | Hardy et al. |
| 6,199,595 B1 | | 3/2001 | Baker |
| 6,235,806 B1 | | 5/2001 | Ohga et al. |
| 6,264,401 B1 | | 7/2001 | Langner et al. |
| 6,264,871 B1 | | 7/2001 | Mullen et al. |
| 6,283,215 B1 | | 9/2001 | Kohler et al. |
| 6,382,259 B1 | | 5/2002 | Codling |
| 6,505,650 B2 | | 1/2003 | Bohon et al. |
| 6,527,015 B2 | * | 3/2003 | Lively .......................... 138/149 |
| 6,668,866 B2 | | 12/2003 | Glejbol et al. |
| 6,736,430 B1 | | 5/2004 | Meulemans et al. |
| 6,739,803 B2 | | 5/2004 | Bass et al. |
| 6,814,146 B2 | | 11/2004 | Bass et al. |
| 6,827,110 B2 | | 12/2004 | Watkins |
| 6,843,950 B1 | | 1/2005 | Mally et al. |
| 6,887,938 B2 | | 5/2005 | Atkinson |
| 6,926,040 B1 | | 8/2005 | Prescott et al. |
| 6,978,807 B1 | | 12/2005 | Keyes |
| 7,069,955 B2 | | 7/2006 | Glejbol et al. |
| 7,101,607 B2 | | 9/2006 | Mollendorf et al. |
| 7,302,973 B2 | | 12/2007 | Glejbol et al. |
| 7,311,123 B2 | | 12/2007 | Espinasse et al. |
| 7,344,161 B2 | | 3/2008 | Howard et al. |
| 2002/0066491 A1 | * | 6/2002 | Lively .......................... 138/149 |
| 2002/0083993 A1 | | 7/2002 | Bohon et al. |
| 2003/0060525 A1 | | 3/2003 | Gupta |
| 2003/0075226 A1 | | 4/2003 | Codling et al. |
| 2004/0076478 A1 | | 4/2004 | Legras et al. |
| 2004/0134556 A1 | * | 7/2004 | Manini et al. .................. 138/149 |
| 2004/0231743 A1 | | 11/2004 | Keyes |
| 2005/0038226 A1 | | 2/2005 | Ratzsch et al. |
| 2005/0095380 A1 | | 5/2005 | Watkins et al. |
| 2005/0214547 A1 | | 9/2005 | Pasquier et al. |
| 2006/0016617 A1 | | 1/2006 | Corbishley |
| 2006/0131027 A1 | | 6/2006 | Chiesa et al. |
| 2006/0272727 A1 | * | 12/2006 | Dinon et al. .................. 138/149 |
| 2007/0221284 A1 | * | 9/2007 | Chenin et al. .................. 138/149 |
| 2008/0079260 A1 | | 4/2008 | Duncan |
| 2008/0128043 A1 | | 6/2008 | Watkins |
| 2008/0136169 A1 | | 6/2008 | Duncan |

FOREIGN PATENT DOCUMENTS

| | | |
|---|---|---|
| CA | 2152150 | 12/1995 |
| CA | 2377767 | 1/2001 |
| CA | 2356451 | 2/2003 |
| CA | 2454541 | 11/2004 |
| CA | 2610202 | 12/2006 |
| CA | 2617156 | 2/2007 |
| CA | 2555756 | 2/2008 |
| EP | 0431000 B1 | 4/1994 |
| EP | 0615596 B1 | 8/1996 |
| EP | 0521582 | 9/1996 |
| EP | 0704036 B1 | 1/1998 |
| EP | 0619343 | 8/1998 |
| EP | 1301343 | 4/2004 |
| EP | 1649205 | 4/2004 |
| EP | 1690662 A1 | 8/2006 |
| GB | 1368665 | 10/1974 |
| GB | 1450012 | 9/1976 |
| GB | 2001664 A | 2/1979 |
| GB | 1547113 | 6/1979 |
| GB | 1590782 | 6/1981 |
| GB | 2215427 A | 9/1989 |
| GB | 2296749 A | 7/1996 |
| GB | 2306127 A | 4/1997 |
| GB | 2365096 A | 2/2002 |
| GB | 2401921 A | 11/2004 |
| JP | 03194289 | 8/1991 |
| WO | WO8704768 | 8/1987 |
| WO | WO8808500 | 11/1988 |
| WO | WO8911618 | 11/1989 |
| WO | WO9319927 | 10/1993 |
| WO | WO9420274 | 9/1994 |
| WO | WO9515461 | 6/1995 |
| WO | WO9533953 | 12/1995 |
| WO | WO9607846 | 3/1996 |
| WO | WO9710936 | 3/1997 |
| WO | WO9748941 | 12/1997 |
| WO | WO0073694 | 12/2000 |
| WO | WO0073695 | 12/2000 |
| WO | WO0102503 | 1/2001 |
| WO | WO0150055 | 7/2001 |
| WO | WO0159348 | 8/2001 |
| WO | WO0212776 | 2/2002 |
| WO | WO2005010894 | 2/2005 |
| WO | WO2005025830 | 3/2005 |
| WO | WO2006134077 | 12/2006 |
| WO | WO2008017147 | 2/2008 |
| WO | WO2009079784 | 7/2009 |

* cited by examiner

HIGH TEMPERATURE RESISTANT INSULATION FOR PIPE

FIELD OF THE INVENTION

The present invention relates to polymeric compositions for insulating fluid and/or gas transport conduits, transport conduits insulated with these compositions, and methods for the production and application thereof. More particularly, the polymeric compositions according to the invention comprise high temperature resistant thermoplastics having low thermal conductivity, high thermal softening point and high compressive creep resistance for use in the thermal insulation of fluid and/or gas transport conduits such as oil and gas pipelines.

BACKGROUND OF THE INVENTION

There is increasing demand in the oil and gas industry for higher performance thermal coatings to insulate and protect off-shore transport conduits operating at temperatures of 130° C., or higher, in water depths above 1,000 meters. In order to maintain the conduit at the required operating temperatures at these depths, the coatings must have low thermal conductivity to prevent the formation of hydrates and waxes that would compromise pumping efficiency of the fluid in the conduit. The thermal conductivity can be further decreased through foaming the coating to some required degree. The materials used in this application must also exhibit high softening point, high thermal stability, and high compressive creep resistance in order to withstand the operating temperatures and hydrostatic pressures acting on the coating in deep water pipe installations. Without sufficient compressive strength, the insulation will be compressed in thickness, thereby increasing thermal conductivity and altering the dimensions and the thermal and hydrodynamic performance of the system. Also, it is important that the coating remain sufficiently ductile after application to the conduit to prevent cracking during pipe handling and installation, for example during reeling onto a lay barge and subsequent deployment therefrom.

Multi-phase fluid flow is common in subsea fluid transport conduits, such as flowlines and risers. Two main concerns in such systems are the formation of gas-water hydrates and the deposition of wax. Both of these phenomena are related to the temperature of the fluid, and in extreme cases the conduit can become severely constricted or even blocked. This in turn can lead to reduced or lost production. In particularly serious cases this may lead to the need to replace sections of pipeline or entire systems with corresponding loss of asset value. Thermal insulation is used to provide controlled energy loss from the system either in steady state condition or in the case of planned and un-planned stoppage and thereby provide a reliable basis for operation.

For single-pipe flowlines and risers, using bonded external insulation, the mechanical loads as well as the requirements placed on the mechanical and thermal performance of thermal insulation systems normally increase with water depth. Hence, the traditional thermal insulation foam technology used in shallow waters and the associated design and test methodologies may not be applicable to deep-water projects. In cases of long pipe tiebacks, for example subsea-to-beach tiebacks, and in cases where the service temperature is above approximately 150° C., there exist limitations with current technology that may hinder the successful development of offshore, deep water oil or gas fields.

Current technologies include single pipe solutions, typically with insulation requirements in the heat transfer coefficient range of 3-5 W/m²K, using polypropylene foam or polyurethane foam as the insulant, and so-called pipe-in-pipe systems wherein a second pipe surrounds the primary conduit, the annulus between the two pipes being filled with an insulating material.

Limitations and deficiencies of these technologies include:

Relatively high thermal conductivity of known insulating systems, necessitating excessively thick coatings to achieve the required insulation performance, leading to potential difficulties in foam processing, potential issues with residual stress, difficulties during pipe deployment, and sea-bed instability.

Insufficient resistance to temperatures above 130° C., resulting in compression and creep resistance issues in high temperature installations at high water depths.

Excessive costs due to poor material cost versus performance capabilities or high transportation and deployment costs.

Deployment and operation disadvantages with Pipe-In-Pipe systems due to weight factors leading to buckling and weld failure if not properly addressed, and the need for high gripping loads during pipe laying.

Although the polystyrene-based insulation systems disclosed in International Publication No. WO 2009/079784 A1 by Jackson et al. (incorporated herein by reference in its entirety) provide improved thermal performance over known insulation systems at operating temperatures up to about 100° C., these polystyrene-based systems generally have insufficient resistance to temperatures above 130° C.

Therefore, there remains a need for improved coatings for thermal insulation and protection of fluid and/or gas transport conduits such as oil and gas pipelines, particularly those operating at high temperatures in excess of 130° C. in water depths above 1,000 meters.

SUMMARY OF THE INVENTION

This invention overcomes the above-mentioned deficiencies through the use of a thermoplastic solid or foam insulation having superior thermal and mechanical properties relative to existing thermoplastic insulating materials to provide the required thermal insulation at the elevated temperatures and high hydrostatic pressures experienced in fluid and/or gas transport conduits situated in deep water.

In one aspect, the present invention provides insulating and protective coatings comprising at least one thermal insulation layer of a high temperature resistant thermoplastic, containing gas bubbles, and having the desired properties of low thermal conductivity, high thermal stability and high compressive strength at elevated temperatures and pressures.

In another aspect, the present invention provides insulating and protective coatings comprising at least one thermal insulation layer of a high temperature resistant thermoplastic, containing hollow polymer, glass or ceramic micro-spheres, and having the desired properties of low thermal conductivity, high thermal stability and high compressive strength at elevated temperatures and pressures.

In yet another aspect, the present invention provides insulating and protective coatings comprising at least one thermal insulation layer of solid, unfoamed high temperature resistant thermoplastic having the desired properties of low thermal conductivity, high thermal stability and high compressive strength at elevated temperatures and pressures.

In yet another aspect, the present invention provides insulating and protective coatings comprising at least one layer of foamed or unfoamed high temperature resistant thermoplastic, and at least one other layer of a dissimilar polymeric material, foamed or unfoamed, having the desired properties of low thermal conductivity, high thermal stability and high compressive strength at elevated temperatures and pressures.

In yet another aspect, the present invention provides insulating and protective coatings comprising at least one layer of foamed or unfoamed high temperature resistant thermoplastic, and at least one other layer of polymer of the same or dissimilar composition foamed to the same or different degree, or density, and having the desired properties of low thermal conductivity, high thermal stability and high compressive strength at elevated temperatures and pressures.

In yet another aspect, the present invention provides a method of manufacturing and applying said insulating and protective coatings whereby at least one layer of high temperature resistant thermoplastic, is extruded, optionally foamed, and applied as a thermal insulation layer, or layers, to the exterior of a steel pipe.

In yet another aspect, the present invention provides an insulated fluid and/or gas transport conduit, such as a high-temperature oil and gas pipeline for use in subsea environments, the pipeline comprising: (a) a continuous steel pipe made up of one or more pipe sections, wherein the steel pipe has an outer surface and an inner surface; (b) a corrosion protection system comprising a high temperature corrosion protection coating bonded directly to the surface of the steel pipe and additional adhesive and topcoat as required; and (c) at least one layer of thermal insulation applied over the corrosion protection system, wherein at least one layer of said thermal insulation is comprised of a high temperature resistant thermoplastic, having low thermal conductivity, high softening point, high thermal stability, high compressive strength and high compressive creep resistance, and which is optionally foamed.

In a further aspect, the present invention provides a thermoplastic pipe joint protection and insulation system, comprised of a high temperature resistant thermoplastic, compatible with, and bondable to, the above mentioned insulating and protective coatings comprising at least one layer of high temperature resistant thermoplastic.

In a further aspect, the present invention provides insulated high-temperature transport conduit for use in offshore, deep water environments, the conduit comprising: (a) a continuous steel pipe made up of one or more pipe sections, wherein the steel pipe has an outer surface and an inner surface; and (b) a first layer of thermal insulation provided over the outer surface of the steel pipe, wherein the first layer of thermal insulation is comprised of a high temperature resistant thermoplastic having low thermal conductivity, high thermal softening point, high compressive strength and high compressive creep resistance.

In a further aspect of the present invention, the first thermal insulation layer may be solid, or may be a blown foam or a syntactic foam having a degree of foaming of up to about 50%. The degree of foaming of the first thermal insulation layer may be from 5-30% or from 10-25%.

In a further aspect of the present invention, the first thermal insulation layer has one or more of the following properties: high compressive creep resistance at higher temperatures (<7% triaxial); high compressive modulus (>1000 MPa); high compressive strength (>25 MPa, uniaxial); low thermal conductivity (<0.200 W/mK); high, long term temperature withstand capability (>130° C.). The first thermal insulation layer may have all of said properties.

In a further aspect of the present invention, the high temperature resistant thermoplastic is selected from one or more members of the group comprising: polycarbonate; polyphenylene oxide; polyphenylene oxide blended with polypropylene, polystyrene or polyamide; polycarbonate blended with polybutylene terephthalate, polyethylene terephthalate, acrylonitrile butadiene styrene, acrylonitrile styrene acrylate, or polyetherimide; polyamides, including polyamide 12 and 612 and elastomers thereof; polymethylpentene and blends thereof; cyclic olefin copolymers and blends thereof; and, partially crosslinked thermoplastic elastomers, also known as thermoplastic vulcanizates or dynamically vulcanized elastomers.

In a further aspect of the present invention, the high temperature resistant thermoplastic is selected from the group comprising polyphenylene oxide and polyphenylene oxide blended with polypropylene, polystyrene or polyamide.

In a further aspect of the present invention, the high temperature resistant thermoplastic is selected from the group comprising blends of polyphenylene oxide with polystyrene, and polyphenylene oxide-polypropylene.

In a further aspect of the present invention, the high temperature resistant thermoplastic is selected from the group comprising polycarbonate and polycarbonate blended with polybutylene terephthalate, polyethylene terephthalate, acrylonitrile butadiene styrene, acrylonitrile styrene acrylate, or polyetherimide.

In a further aspect of the present invention, the high temperature resistant thermoplastic has a Vicat softening point in the range from 130-200° C. and a thermal conductivity of from 0.15-0.20 W/mK.

In a further aspect of the present invention, the insulated high-temperature transport conduit further comprises a corrosion protection coating directly applied to the outer surface of the steel pipe and bonded thereto, and underlying the first thermal insulation layer.

In a further aspect of the present invention, the corrosion protection coating comprises a layer of cured epoxy or modified epoxy. The corrosion protection coating may comprise an epoxy phenolic, polyphenylene sulphide, polyphenylene oxide or polyimide, including modified versions and blends thereof.

In a further aspect of the present invention, the first thermal insulation layer is in direct contact with the corrosion protection coating and directly adhered thereto, the corrosion protection coating having been treated by plasma or corona discharge prior to application of the first thermal insulation layer.

In a further aspect of the present invention, the corrosion protection coating comprises a multi-layer corrosion protection system applied to the outer surface of the steel pipe and underlying the first thermal insulation layer, wherein the multi-layer corrosion protection system comprises: (a) a layer of said cured epoxy or modified epoxy directly applied to the outer surface of the steel pipe and bonded thereto; and (b) a first adhesive layer applied directly to the corrosion protection layer and underlying the first thermal insulation layer. The adhesive layer may be comprised of a polymer provided with functional groups and having a mutual affinity for the corrosion protection layer and the first thermal insulation layer. The first thermal insulation layer is in direct contact with the first adhesive layer and is bonded thereto.

In a further aspect of the present invention, the multi-layer corrosion protection system further comprises: (c) a first protective topcoat comprised of an unfoamed polymeric material in direct contact with the first adhesive layer and bonded thereto, wherein the first thermal insulation layer is in direct contact with the first protective topcoat and bonded thereto.

In a further aspect of the present invention, the corrosion protection coating comprises a single-layer composite corrosion protection coating directly applied to the outer surface of the steel pipe and bonded thereto and in direct contact with the first thermal insulation layer, wherein the single-layer composite corrosion protection coating comprises a cured epoxy resin, an adhesive and an unfoamed polymeric material.

In a further aspect of the present invention, the insulated transport conduit further comprises an outer protective topcoat applied over the first thermal insulation layer and forming an outer surface of the insulated transport conduit, wherein the outer protective topcoat is comprised of an unfoamed polymeric material.

In a further aspect of the present invention, the first thermal insulation layer is in direct contact with the outer protective topcoat and directly adhered thereto, the first thermal insulation layer having been treated by plasma or corona discharge prior to application of the outer protective topcoat.

In a further aspect of the present invention, the insulated transport conduit further comprises a second thermal insulation layer in the form of a solid, a blown foam or a syntactic foam. The second thermal insulation layer may be comprised of a polymeric material which is dissimilar to the high temperature resistant thermoplastic comprising the first thermal insulation layer. The dissimilar polymeric material may be selected from one or more members of the group comprising: solid or foamed polypropylene homopolymer or copolymer, polybutylene, polyethylene; polystyrene, high impact polystyrene, modified polystyrene, and crosslinked or partially crosslinked polypropylene and polyethylenes, including copolymers, blends and elastomers thereof; and the first thermal insulation layer underlies the second thermal insulation layer. The first and second thermal insulation layers may be foamed to different degrees, for example the second thermal insulation layer may be foamed to a greater degree than the first thermal insulation layer.

In a further aspect of the present invention, the first thermal insulation layer underlies the second thermal insulation layer, and is in direct contact with the second thermal insulation layer and directly adhered thereto, the first thermal insulation layer having been treated by plasma or corona discharge prior to application of the second thermal insulation layer.

In a further aspect of the present invention, the first and second thermal insulation layers are separated by a layer of unfoamed polymeric material.

In a further aspect of the present invention, interlayer adhesion is provided between the layer of unfoamed polymeric material and the first and second thermal insulation layers by treating the first thermal insulation layer with plasma or corona discharge prior to application of the layer of unfoamed polymeric material, and by plasma or corona discharge of the layer of unfoamed polymeric material prior to application of the second thermal insulation layer.

In a further aspect of the present invention, an adhesive layer is provided between the layer of unfoamed polymeric material and one or both of the first and second thermal insulation layers. The unfoamed polymeric material may comprise an adhesive.

In a further aspect of the present invention, the insulated transport conduit further comprises a moulded pipe joint insulation system directly bonded to both the corrosion protection coating system and first thermal insulation layer at a joint connecting two pipe sections. The moulded pipe joint insulation system may be comprised of a high temperature resistant thermoplastic as defined herein.

In a further aspect, the present invention provides an insulated high-temperature transport conduit for use in offshore, deep water environments, the conduit comprising: (a) a continuous steel pipe made up of one or more pipe sections, wherein the steel pipe has an outer surface and an inner surface; and (b) a first layer of thermal insulation provided over the outer surface of the steel pipe, wherein the first layer of thermal insulation is a solid, a blown foam or a syntactic foam and is comprised of polypropylene; and (c) a second layer of thermal insulation provided over the first layer of thermal insulation, wherein the second layer of thermal insulation is a solid, a blown foam or a syntactic foam and is comprised of polybutylene. Both the first and second layers of thermal insulation may be solid.

In a further aspect of the present invention, the corrosion protection coating comprises a single-layer corrosion protection coating directly applied to the outer surface of the steel pipe and bonded thereto, wherein the single-layer composite corrosion protection coating is comprised of a styrene-maleic anhydride copolymer. The styrene-maleic anhydride copolymer may be blended with acrylonitrile-butadiene-styrene (ABS).

BRIEF DESCRIPTION OF THE DRAWINGS

The invention will now be described, by way of example only, with reference to the accompanying drawings in which.

DETAILED DESCRIPTION OF PREFERRED EMBODIMENTS

The present invention relates to insulating and protective coatings and thermally insulated fluid and/or gas transport conduits incorporating said coatings for use in subsea environments. The present invention also relates to methods of manufacturing said insulating and protective coatings and for manufacturing thermally insulated high-temperature fluid and/or gas transport conduits incorporating said coatings.

The term "high temperature" as used herein refers to operating temperatures or service temperatures which are greater than 130° C., for example in the range from 130-200° C., or in the range from 150-200° C.

The term "solid" as used herein with reference to one or more of the layers of an insulated transport conduit means that the layers are unfoamed, i.e. solid layers as defined herein have a degree of foaming of 0%, and do not incorporate microspheres as would be present in syntactic foams.

The term "foam" as used herein includes both blown foams and syntactic foams, as defined in the following description.

The fluid and/or gas transport conduits described below are oil and gas pipelines which are typically made up of one or more steel pipe sections. The term "fluid and/or gas transport conduits", and similar terms as used herein, are intended to include such oil and gas pipelines and related components, including flowlines, risers, jumpers, spools, manifolds and ancillary equipment.

A major consideration in the use of steel pipe is protection of the pipe from long-term corrosion in humid and high-temperature service conditions. Therefore the insulating and protective coatings according to the invention may comprise one or more corrosion-protection layers or a multi-layer corrosion protection system which is applied over the blasted and cleaned steel pipe prior to the application of any subsequent layers, including the at least one layer of high temperature resistant thermoplastic according to the invention. For example, the corrosion protection layer may comprise a cured epoxy layer directly applied to the outer surface of the steel pipe and bonded thereto.

It will be appreciated that layers making up the insulating and protective coatings described below are not shown to scale in the drawings. In particular, the thicknesses of some of the layers making up the coatings are exaggerated in relation to the thicknesses of the other layers and also relative to the thickness and diameter of the steel pipe.

Figure 1:
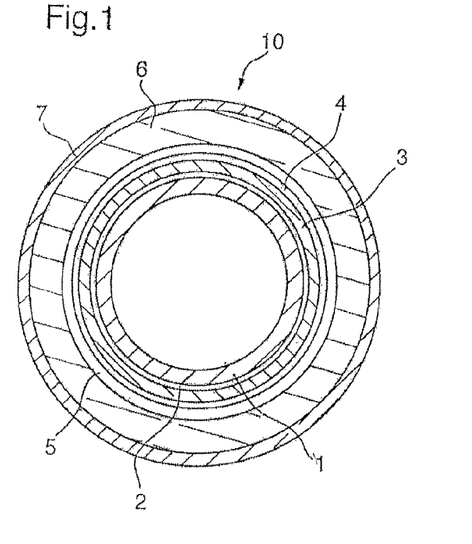
FIG. 1 is a transverse cross-section of an insulated pipeline according to a first embodiment of the invention.

FIG. 1 illustrates a transverse cross-section of an insulated oil and gas pipeline 10 according to a first embodiment of the invention. The insulated pipeline 10 includes one or more sections of steel pipe 1 in which the insulating and protective coating includes a three-layer corrosion protection system. According to this system, the steel pipe 1 is coated with a corrosion protection layer 2 comprised of cured epoxy or other high temperature corrosion protection material as described below, an intermediate first adhesive layer 3 applied over the corrosion protection layer 2, and a first protective topcoat 4 applied over the first adhesive layer 3. The first protective topcoat 4 provides added corrosion and mechanical protection and the adhesive layer 3 provides an adhesive bond between the topcoat 4 and the underlying corrosion protection layer 2. The topcoat 4 is shown in FIG. 1 as a relatively thin layer between the adhesive layer 3 and the overlying insulation layers described below. The composition and thickness of the topcoat 4 will at least partially depend on the compositions of the underlying adhesive layer 3 and the overlying insulation layers, particularly with respect to adhesion to those layers. The topcoat 4 may also comprise the first insulation layer. In terms of composition, the topcoat may preferably comprise an extrudable thermoplastic resin which may comprise the same material as an overlying thermal insulation layer, or a material compatible with or bondable to the thermal insulation layer, including a blend of two or more materials.

Figure 2:
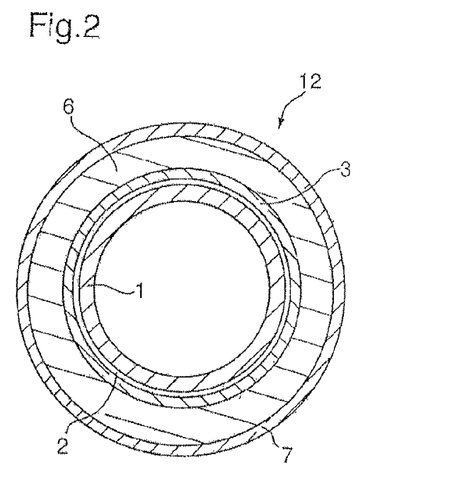
FIG. 2 is a transverse cross-section of an insulated pipeline according to a second embodiment of the invention.
Figure 4:
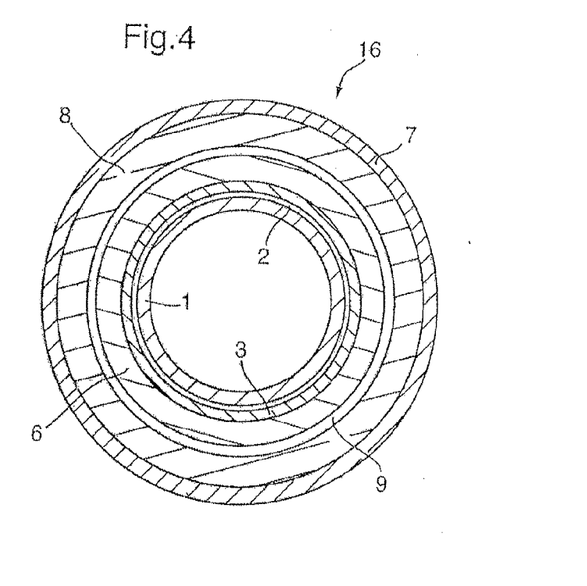
FIG. 4 is a transverse cross-section of an insulated pipeline according to a fourth embodiment of the invention.

FIG. 2 illustrates a transverse cross-section of an insulated oil and gas pipeline 12 according to a second embodiment of the invention. The insulated pipeline 12 includes one or more sections of steel pipe 1 provided with a two-layer corrosion protection system, wherein the steel pipe 1 is provided with a corrosion protection layer 2 comprised of cured epoxy or other high temperature corrosion protection material as described below and a first adhesive layer 3 applied over layer 2, as in FIG. 1. In the corrosion protection system shown in FIG. 2 the first adhesive layer 3 doubles as both adhesive and topcoat, thereby eliminating the need for the separate application of a first protective topcoat 4. A similar two-layer corrosion protection system is shown in FIG. 4 which illustrates a transverse cross-section of an insulated oil and gas pipeline 16 according to a fourth embodiment of the invention.

Figure 3:
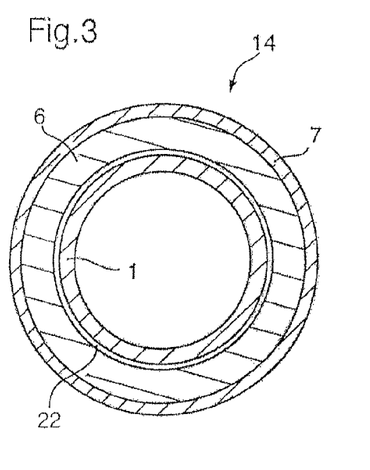
FIG. 3 is a transverse cross-section of an insulated pipeline according to a third embodiment of the invention.

As an alternative to the multi-layer corrosion protection systems illustrated in FIGS. 1, 2 and 4, the steel pipe 1 may instead be provided with a single-layer composite corrosion protection layer wherein the epoxy or other high temperature corrosion protection material described below, adhesive and polymer topcoat components are pre-mixed and applied onto the pipe 1 as a variably graded coating. FIG. 3 illustrates a transverse cross-section of an insulated oil and gas pipeline 14 according to a third embodiment of the invention. The insulated pipeline 14 includes one or more sections of steel pipe 1 provided with such a single-layer composite corrosion protection coating 22.

In the insulated oil and gas pipelines according to the invention, the insulating and protective coatings also comprise one or more thermal insulation layers, which include one or more foamed layers and/or one or more unfoamed, solid layers. The pipelines 10, 12 and 14 illustrated in FIGS. 1 to 3 include a single thermal insulation layer 6, whereas the pipeline 16 of FIG. 4 is provided with first (inner) and second (outer) thermal insulation layers 6 and 8. It will also be appreciated that insulated oil and gas pipelines according to the invention may comprise more than two layers of thermal insulation, each of which may be foamed or unfoamed.

Where the insulated pipeline includes a single corrosion protection layer or a multi-layer corrosion protection system, the thermal insulation layer 6 must firmly adhere to said corrosion protection layer or system. This is a particularly important consideration if the thermal insulation layer 6 and the underlying corrosion protection layer, or system, are comprised of dissimilar polymeric materials. Adhesion between the layers, also known as interlayer adhesion, is also dependant upon the coating temperature and the mode of application of the layers. For example, it may be necessary to pre-heat the corrosion protection layer or system prior to the application of the overlying thermal insulation layer 6 to better fuse the two layers together and maximize interlayer adhesion. It may also be necessary to apply an adhesive layer between the corrosion protection layer, or system, and the thermal insulation layer 6. This is illustrated, for example, in FIG. 1, in which a second adhesive layer 5 is applied between the thermal insulation layer 6 and the underlying protective topcoat 4 of the three-layer corrosion protection system, and serves to bond the thermal insulation layer 6 to the topcoat 4. In the embodiments of FIGS. 2 and 4, the first adhesive layer 3 serves as both an adhesive and a protective topcoat and bonds the thermal insulation layer 6 to the corrosion protection layer 2. In the embodiment of FIG. 3, the thermal insulation layer 6 is directly bonded to the corrosion protective layer 2 without the aid of an adhesive layer.

Interlayer adhesion may also be accomplished through the activation of one or more of the surfaces to be adhered using plasma or corona discharge treatment. In this case a separate adhesive layer would be unnecessary.

Where either of the thermal insulation layers 6, 8 are foamed, an additional consideration is the effect of interlayer adhesion on foam integrity, since any collapse of the foam structure at the interface due to applied heat and pressure to effect adhesion will compromise the overall thermal insulation performance of the system.

As shown in FIGS. 1 to 5, an outer protective topcoat 7 may be applied over the outer layer of insulation to provide further resistance to static pressure at great depths, particularly if said outer layer of insulation is foamed. The outer protective topcoat 7 may, for example, comprise the same polymeric material as one or more of the thermal insulation layers, or a modified or reinforced version thereof, but is preferably in a solid, unfoamed state.

It will be appreciated that the outer protective topcoat and the thermal insulation layers may instead be comprised of different polymeric materials, in which case it may be preferred to provide an additional layer of adhesive (not shown) between the outer layer of thermal insulation and the outer protective layer. It will also be appreciated that the protective topcoat 7 is not necessary in all embodiments of the invention, and FIGS. 6 to 9 illustrate insulated pipelines 18, 20, 24 and 26 which are identical to pipelines 10, 12, 14 and 16, respectively, with the exception that they do not include a protective topcoat 7. It will be appreciated that the outer protective topcoat may be unnecessary, for example, where the outermost thermal insulation layer is a solid, or is foamed but naturally forms a solid skin.

As shown in FIG. 4, the insulating and protective coating may comprise more than one thermal insulation layer of the same polymer composition foamed to different degrees, or densities, or it may comprise more than one thermal insulation layer of solid or foam made from dissimilar polymer materials. This allows the system to be tailored for precise thermal insulation performance related to the system requirements of the installed application.

Figure 5:
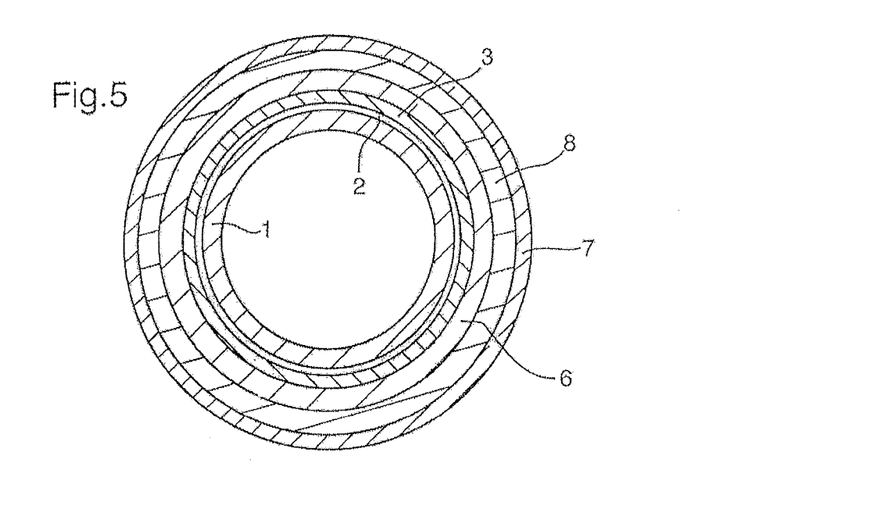
FIG. 5 is a transverse cross-section of an insulated pipeline according to a fifth embodiment of the invention.
Figures 6, 7, 8, 9:
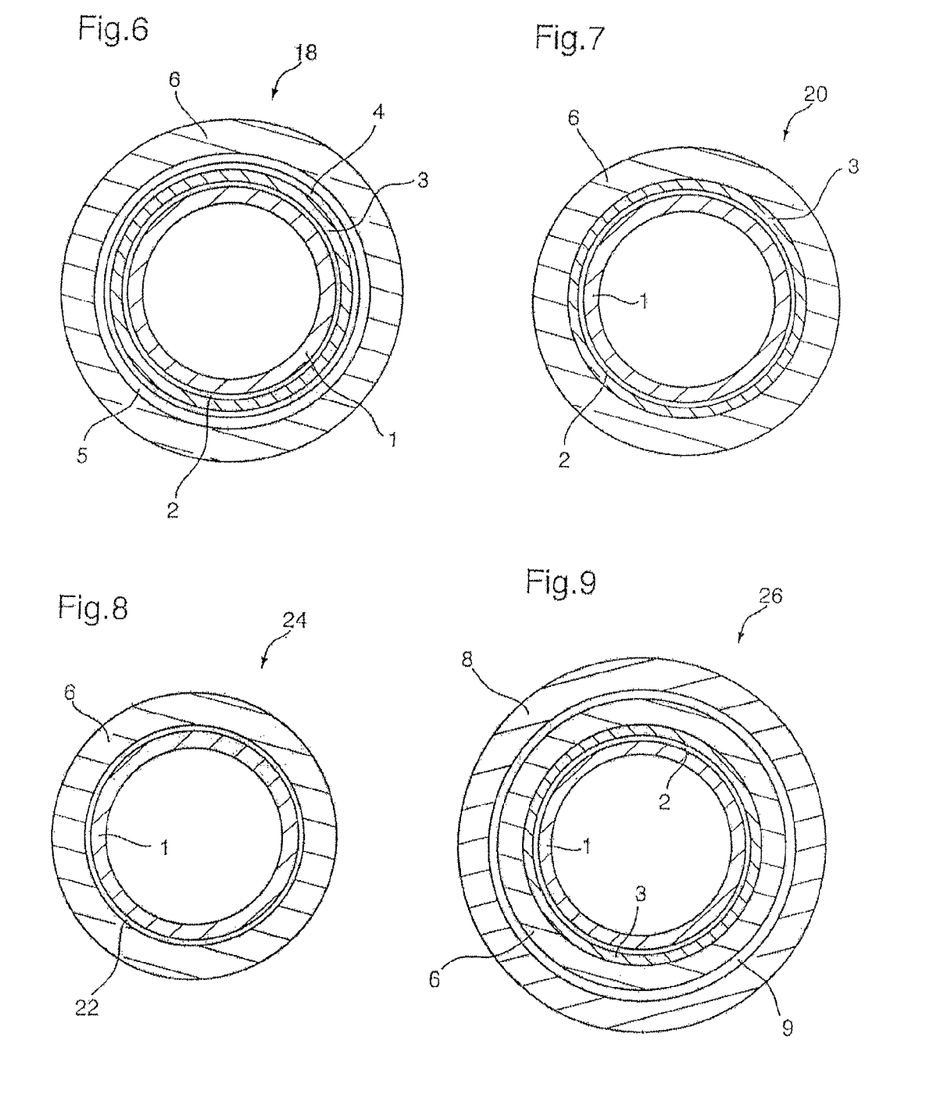
FIG. 6 is a transverse cross-section of an insulated pipeline according to a sixth embodiment of the invention.
FIG. 7 is a transverse cross-section of an insulated pipeline according to a seventh embodiment of the invention.
FIG. 8 is a transverse cross-section of an insulated pipeline according to a eighth embodiment of the invention.
FIG. 9 is a transverse cross-section of an insulated pipeline according to an eighth embodiment of the invention.

The embodiment illustrated in FIG. 4 includes an inner thermal insulation layer 6 and an outer thermal insulation layer 8 which may be of the same or different composition and/or density. The thermal insulation layers 6 and 8 are separated by a layer 9 of unfoamed polymeric material which may be of the same or different composition as either one or both of the layers 6 and 8 and may function as an adhesive between layers 6 and 8. It will be appreciated that an adhesive layer may be provided between the layers 6 and 8, or between one or more of layers 6, 8 and the adjacent unfoamed layer 9, or between any additional thermal insulation layers, particularly if said layers are of dissimilar composition. It will also be appreciated that the unfoamed layer 9 may not be necessary in all situations, for example where individual thermal insulation layers can be bonded directly to one another, or where plasma or corona treatment is used to effect adhesion. This is illustrated in FIG. 5 which shows an insulated pipeline 17 identical to the pipeline 16 of FIG. 4 except for the omission of unfoamed layer 9 between layers 6 and 8.

Although the embodiments of the invention shown in the drawings include either one or two thermal insulation layers, it will be appreciated that insulated pipelines according to the invention may include more than two layers of foamed or unfoamed thermal insulation, with or without layers of unfoamed polymer and/or adhesive being provided between the foam layers.

It is also necessary in the application to provide thermal insulation around the joint area where two lengths of steel pipe are welded together. The composition of this pipe joint insulation system must be bondable to both the corrosion protection layer, or system, applied directly over the welded pipe joint and the existing thermal insulation layer, or layers, including any protective topcoats and any other layers of the insulated pipe exposed as a result of cutting back the insulation from the pipe ends to allow welding thereof.

Figure 10:
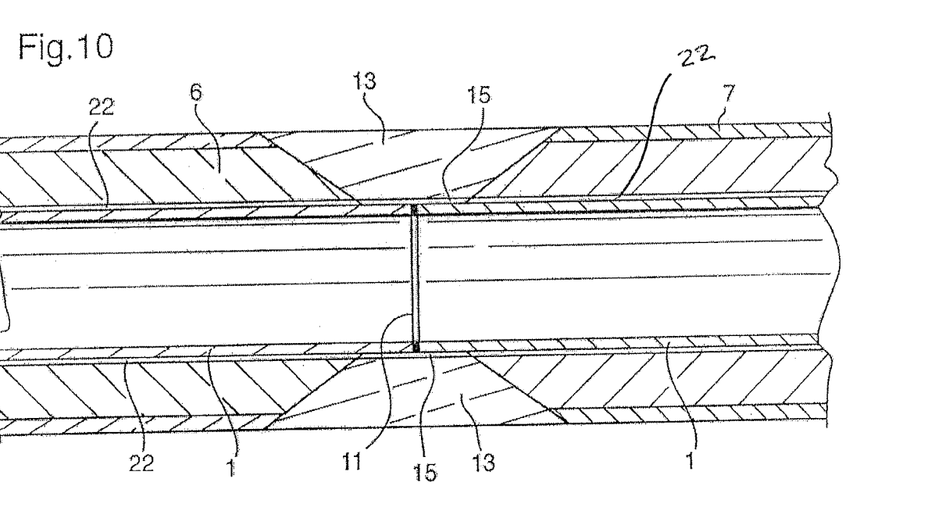
FIG. 10 is a longitudinal cross-section of the pipe joint area of 2 insulated pipelines welded together.

FIG. 10 illustrates a longitudinal cross-section of a circular pipe joint weld area 11 at which two steel pipes 1 are joined. The steel pipes 1 each have an insulating and protective coating as shown in FIG. 3 comprising a corrosion protection layer 22, a thermal insulation layer 6 and an outer protective topcoat 7. It will, however, be appreciated that the pipes 1 could be provided with any of the insulating and protective coatings shown in the drawings or described herein. The pipe joint weld area 11 is provided with pipe joint insulation, 13 which, for example, is bonded to a corrosion protection system 15 comprising an epoxy inner layer and an adhesive top layer, and to the insulation layer 6 and topcoat 7. The corrosion protection system 15 may have the same composition and thickness as any of the corrosion protection layers or systems described therein, and the pipe joint insulation layer 13 may have the same composition as any of the thermal insulation layers described herein. The pipe joint insulation system is further described below.

Composition of Layers
Corrosion Protection Coating(s)

As mentioned above, it may be advantageous to apply one or more corrosion protection layers or a multi-layer corrosion protection system to the steel pipe prior to any subsequent layers. The initial corrosion protection layer, namely that coating bonded directly to the steel pipe, may be preferably comprised of cured epoxy, or modified epoxy, which is applied onto the cleaned and pre-heated pipe surface either, a) as a fusion bonded powder by spraying the pipe with powder-spray guns, passing the pipe through a "curtain" of falling powder, or using a fluidized bed containing the powder, or, b) as a liquid coating using liquid-spray guns. Curing of the epoxy results from contact with the hot pipe.

It may also be preferred to apply additional layers over the partially cured epoxy. In the 3-layer corrosion protection system illustrated in FIG. 1, an olefin-based adhesive copolymer, for example a maleic anhydride functionalised polyolefin, may be applied directly to the partially cured epoxy, followed by the application of a polymer topcoat over the adhesive for mechanical protection. The function of the adhesive is to bond the topcoat or the first thermal insulation layer to the epoxy corrosion protection layer. The adhesive and polymer topcoat may be applied by extrusion side-wrap or by powder spray methods.

The adhesive layer may also comprise a coextruded structure of two or more layers, the outer layers of which will bond to the respective corrosion protection layer and subsequent topcoat or thermal insulation layer with which they are compatible.

As alternatives to the cured epoxies mentioned above, the corrosion protection layer may instead comprise modified epoxies, epoxy phenolics, modified styrene-maleic anhydride copolymers such as styrene-maleic anhydride-ABS (acrylonitrile-butadiene-styrene) blends, polyphenylene sulphides, polyphenylene oxides, or polyimides, including modified versions and blends thereof. In some cases, it has been found that an adhesive layer is not needed to bond these corrosion protection coatings to the pipe or to the topcoat or first insulation layer. Some of these materials can also be used at higher service temperatures than the epoxy-based corrosion protection systems described above.

Some of the higher temperature-resistant corrosion protection coatings mentioned above may also have properties which make them suitable for use as thermal insulation layers in any of the embodiments of the invention. While the corrosion protection coating will typically be comprised of a different polymer grade having different properties, it is conceivable that the same type and grade of polymer may be used for both corrosion protection and thermal insulation. In this case, a single layer of this polymer may serve as both corrosion protection coating and thermal insulation layer.

An adhesive layer would not be necessary where it is possible to achieve bonding of adjacent layers using plasma or corona treatment.

Additional Adhesive Layer(s)

In cases where it is necessary to apply an adhesive layer between adjacent thermal insulation layers or between a thermal insulation layer and one or more of the other layers, including any solid protective layers and topcoats, particularly layers of dissimilar composition, the adhesive material used should ideally bond equally well to said layers. The adhesives used are typically polymers with functionalities having mutual affinity to the layers requiring bonding, the functionalities being specific to the chemical composition of the layers requiring bonding. Preferably the bond strength should be high enough to promote cohesive failure between the individual layers.

The adhesive layer may also comprise a coextruded structure of two or more layers, the outer layers of which will bond to the respective insulation layers or topcoats with which they are compatible.

The adhesive layer between adjacent thermal insulation layers and between a thermal insulation layer and one or more of the other layers may, for example, comprise a grafted polymer or copolymer, or polymer blend with one or more moieties compatible with each of the individual layers to be bonded.

The adhesive layer is preferably applied by powder spray application, or side-wrap, crosshead extrusion or co-extrusion methods.

An additional adhesive layer would not be necessary where the two adjacent layers have a mutual affinity for each other, or where it is possible to achieve bonding of the layers using plasma or corona treatment.

Thermal Insulation Layer(s) and Protective Topcoat

The thermal insulations used in the present invention are designed to withstand operating temperatures in excess of the maximum operating temperatures (130° C.) of systems currently used for the thermal insulation of subsea pipelines, such as polypropylene. These operating temperatures may be as high as 200° C. The thermal insulations are also designed to exhibit adequate compressive creep resistance and modulus at these temperatures to prevent collapse of the foam structure in deep water installations, and hence maintain the required thermal insulation over the lifetime of the oil and gas recovery project. In addition, the compositions should be sufficiently ductile to withstand the bending strains experienced by the insulated pipe during reeling and installation operations.

The insulating and protective coatings according to the present invention are prepared from high temperature resistant thermoplastics selected to provide solid or foam insulation layers with one or more of the following properties:

high compressive creep resistance at higher temperatures (<7% triaxial creep),
high compressive modulus (>1000 MPa),
high compressive strength (>25 MPa, uniaxial),
low thermal conductivity (<0.200 W/mK),
high specific heat capacity (>1300 J/kgK),
high, long term temperature withstand capability (>130° C., eg. 130-200° C. or 150-200° C.),
adequate ductility (>10% elongation at break).

The insulating layers according to the invention, having one or more of the above properties, are applied at sufficient thicknesses so as to provide the insulated transport conduit with an acceptable heat transfer coefficient (U) for the conditions under which it is to be used, with U typically being in the range from about 2 to about 10 W/m$^2$K. The thicknesses of the insulation layers are highly variable, due to the fact that each pipeline system is designed for use under specific conditions of depth, temperature etc.

Preferably, the insulating and protective coatings according to the invention have all the above properties.

The high temperature resistant thermoplastics are preferably selected from one or more members of the group comprising:
polyphenylene oxide,
polyphenylene oxide blended with homopolymers or copolymers of polypropylene, polystyrene and/or polyamide,
polycarbonate,
polycarbonate blended with polybutylene terephthalate, polyethylene terephthalate, acrylonitrile butadiene styrene, acrylonitrile styrene acrylate, and/or polyetherimide,
polyamides, such as polyamide 12 and 612, and elastomers thereof
polymethylpentene, and blends thereof.
cyclic olefin copolymers, and blends thereof,
partially crosslinked thermoplastic elastomers, also known as thermoplastic vulcanizates or dynamically vulcanized elastomers.

Intrinsic material properties of the above thermoplastics are noted below in Table 1.

TABLE 1

| | Property | | | | | | |
|---|---|---|---|---|---|---|---|
| Material | Tensile Strength (MPa) | Tensile Strain (%) | Flexural Modulus (MPa) | Thermal Conductivity (W/mK) | Specific Heat Capacity (J/gK) | Vicat Softening Point (° C.) | Heat Deflection Temperature, 0.45 MPa (° C.) |
| PPO-PS | 50 | 30 | 2,500 | 0.18 | 2.0 | 140 | 137 |
| PPO-PP | 33 | 190 | 1,600 | 0.20 | 2.0 | 138 | 113 |
| PC | 65 | 110 | 2,300 | 0.19 | 1.3 | 157 | 138 |
| PC-ASA | 53 | 50 | 2,300 | 0.17 | 1.3 | 136 | 125 |
| PA 612 | 60 | 35 | 2,000 | 0.22 | 2.7 | 180 | 150 |
| PMP | 20 | 30 | 1,600 | 0.17 | 2.0 | 170 | 90 |
| COC | 60 | 2.5-10 | 3,000 | 0.15 | | 180 | 170 |
| TPV | 25 | 600 | 1,200 | 0.17 | | NA | NA |

PPO-PS = polyphenylene oxide blended with polystyrene
PPO-PP = polyphenylene oxide blended with polypropylene
PC = polycarbonate
PC-ASA = polycarbonate blended with acrylonitrile styrene acrylate
PA 612 = polyamide 612
PMP = polymethylpentene
COC = cyclic olefin copolymer
TPV = thermoplastic vulcanizate The high temperature resistant thermoplastics for use in the present invention may have a Vicat softening point in the range from 130-200° C., for example in the range from 135-180° C.; thermal conductivity of no greater than 0.22, for example from 0.15-0.20.

Where the high temperature resistant thermoplastic is polyphenylene oxide blended with homopolymers or copolymers of polypropylene, polystyrene and/or polyamide, it will be understood that the blend is predominantly comprised of polyphenylene oxide, i.e. polyphenylene oxide is present in the blend in an amount of at least 50 weight percent. Examples of polyphenylene oxide-polypropylene blends useful in the present invention are commercially available under the trade name Noryl™.

Similarly, where the high temperature resistant thermoplastic is a blend of any of the other high temperature resistant thermoplastics mentioned above (i.e. polycarbonate, polyamide, or partially crosslinked thermoplastic elastomer), it will be understood that the blend is predominantly comprised of said high temperature resistant thermoplastic, i.e. such that the high temperature resistant thermoplastic is present in the blend in an amount of at least 50 weight percent.

As mentioned above, one or more of the thermal insulation layers may also be provided with an additional protective layer, or topcoat, such as layers 7 and 9 described above, comprised of unfoamed polymeric material. Typically, but not necessarily, the protective layers are prepared from the same material as the underlying thermal insulation layer, or a modified or reinforced version thereof.

It may be required, for example, to impart a higher degree of physical or chemical performance, such as impact, abrasion, crush or moisture resistance, to the outer surface of the insulated pipe, in which case it may be advantageous to prepare the outer protective topcoat from a polymeric material having superior impact, abrasion, crush or chemical resistance to that from which the thermal insulation layer, or layers, is made. Such a material may comprise the thermal insulation material blended with suitable polymeric modifiers, compatibilisers, or reinforcing fillers or fibres, or it may comprise a dissimilar, preferably compatible, polymeric material. In the latter case, it may be necessary to apply an additional adhesive layer between the final thermal insulation layer and topcoat to effect adequate bonding of the two layers.

Also, as mentioned above, the insulation layers may comprise dissimilar materials, or materials foamed to different degrees. In a preferred example, a polymer with higher temperature resistance or softening point such as modified polyphenylene oxide may be used as an inner unfoamed or foamed thermal insulation layer closest to the hot steel pipe to function as a heat barrier, with a lower temperature resistant or lower thermal conductivity unfoamed or foamed polymer as an outer secondary, or tertiary, thermal insulation layer. Such outer layers may comprise polystyrene and modified polystyrene, including high impact polystyrene and styrene copolymers; polybutylene; polypropylene homopolymer and copolymers; polyethylene; and crosslinked or partially crosslinked polypropylene and polyethylene, including copolymers, blends and elastomers thereof. It may also be necessary to apply an additional adhesive layer between the layers of dissimilar insulation materials to effect adequate bonding of the insulation layers.

The thermal insulation layers may also be foamed to different degrees the further they are away from the pipe wall; for example, outer layers of insulation may be foamed to progressively higher degrees than inner layers to provide tailored thermal performance of the system.

Thermal insulation compositions prepared from these materials may also contain additives selected from one or more members of the group comprising inorganic fillers, reinforcing fillers or fibres, nano-fillers, conductive fillers, flame-retardant fillers, antioxidants, heat-stabilisers, process aids, compatibilisers, and pigments.

Foaming Agents

Foamed thermal insulation layers in the insulating and protective coatings according to the invention can be prepared from the aforementioned high temperature resistant thermoplastics, by incorporating chemical foaming agents, by the physical injection of gas or volatile liquid, or by blending with hollow polymer, glass or ceramic microspheres. Foams generated through the action of chemical or physical foaming agents are generally referred to as "blown" foams. Foams containing hollow microspheres are referred to as "syntactic" foams.

Syntactic foams provide superior compressive creep and crush resistance than blown foams, but are generally less efficient thermal insulators and are considerably more expensive. A cost and performance optimized design may, for example, comprise one or more layers of syntactic foam surrounded by one or more layers of blown foam insulation.

Chemical foaming agents may function via either an endothermic (heat absorbing) or exothermic (heat generating) reaction mechanism. They are selected from one or more members of the group comprising sodium bicarbonate, citric acid, tartaric acid, azodicarbonamide, 4,4-oxybis(benzene sulphonyl) hydrazide, 5-phenyl tetrazole, dinitrosopentamethylene tetramine, p-toluene sulphonyl semicarbazide, or blends thereof. Preferably the chemical foaming agent is an endothermic foaming agent, such as sodium bicarbonate blended with citric or tartaric acid.

Chemical foaming occurs when the foaming agent generates a gas, usually $CO_2$ or $N_2$, through decomposition when heated to a specific decomposition temperature. The initial decomposition temperature along with gas volume, release rate and solubility are important parameters when choosing a chemical foaming agent and they need to be carefully matched to the melt processing temperature of the particular thermoplastic being foamed.

For physical foaming, the gas or volatile liquid used is selected from the group comprising $CO_2$, supercritical $CO_2$, $N_2$, air, helium, argon, aliphatic hydrocarbons, such as butanes, pentanes, hexanes and heptanes, chlorinated hydrocarbons, such as dichloromethane and trichloroethylene, and hydrochlorofluorocarbons, such as dichlorotrifluoroethane. In the case of volatile liquids, foaming occurs when the heated liquid vaporizes into gas. Preferably the physical foaming agent is supercritical $CO_2$.

The hollow microspheres are selected from one or more members of the group comprising glass, polymeric, or ceramic, including silica and alumina, microspheres. Preferably the hollow microspheres are lime-borosilicate glass microspheres.

Thermal Insulation Application Process

The foamed or unfoamed thermal insulation layer, or layers, and any unfoamed protective layers, are applied to the steel pipe or a pipeline, preferably over the corrosion protection coating, or coatings, by sidewrap or crosshead extrusion, or co-extrusion, processes.

Extrusion may be accomplished using single screw extrusion, either in single or tandem configuration, or by twin-screw extrusion methods. In the case of single screw extrusion, the extruder screw may be either single stage or 2-stage design.

A single stage compression screw would be adequate for chemical foam extrusion whereby the foaming agent is added as a pelleted concentrate or masterbatch which is pre-mixed with the polymer to be foamed using a multi-component blender, for example, mounted over the main feed port of the extruder. The design of the screw is important and it may incorporate barrier flights and mixing elements to ensure effective melting, mixing, and conveying of the polymer and foaming agent.

With a 2-stage screw, the first and second stages are separated by a decompression zone, at which point a gas or liquid physical foaming agent can be introduced into the polymer melt via an injection or feed port in the extruder barrel. The first stage acts to melt and homogenize the polymer, whereas the second stage acts to disperse the foaming agent, cool the melt temperature, and increase the melt pressure prior to the melt exiting the die. This may also be accomplished by tandem extrusion, wherein the two stages are effectively individual single screw extruders, the first feeding into the second. A 2-stage screw is also preferred for the extrusion of polymers which have a tendency to release volatiles when melted, or are hygroscopic, the extruder barrel then being equipped with a vent port positioned over the decompression zone through which the volatiles or moisture can be safely extracted.

Twin screw extrusion is preferred where the polymer to be foamed is shear sensitive or if it is required that fillers or other additives be incorporated into the insulation composition. It is particularly recommended for the extrusion of syntactic foams or blown foams prepared by the physical injection of a gas or liquid foaming agent. Since the twin screw design is typically modular, comprising several separate and interchangeable screw elements, such as mixing and conveying elements, it offers great versatility with respect to tailoring the screw profile for optimum mixing and melt processing.

In the case of syntactic foams, for example, the hollow microspheres are fed directly into the polymer melt using a secondary twin-screw feeder downstream of the main polymer feed hopper. An additional consideration with syntactic foams is potential breakage of the hollow microspheres during extrusion of the foam. Shear and compressive forces inside the extruder need to be minimized during processing of the foam to prevent this through judicious design of the extruder screw(s), barrels, manifolds and dies.

A static mixing attachment or gear pump may be inserted between the end of the screw and the die to further homogenize the melt, generate melt pressure, and minimize melt flow fluctuations.

For chemically or physically blown foams, the degree of foaming is dependant upon the required balance of thermal conductivity and compressive strength. Too high a degree of foaming, whilst beneficial for thermal insulation performance, may be detrimental to the compressive strength and creep resistance of the foam. The thermoplastic foams of the present invention are typically foamed from about 5% to about 50%, more preferably 5% to 30%, or 10% to 25%. The degree of foaming is defined herein as the degree of rarefaction, i.e. the decrease in density, and is defined as $[(D_{matrix} - D_{foam})/D_{matrix}] \times 100$. Expressed in this way, the degree of foaming reflects the volume percentage of gas under the assumption that the molecular weight of gas is negligible compared to that of the matrix, which is generally true. Alternatively, the degree of foaming can be measured visually by microscopic determination of cell density.

With respect to the particular foam insulations described herein, it is important that conditions of mixing, temperature and pressure are adjusted to provide a uniform foam structure comprising very small or microcellular bubbles with a narrow size distribution evenly distributed within the polymer matrix, in order to ensure maximum compressive strength, thermal performance and compressive creep resistance of the insulation when subjected to high external pressures and pressures. Also, when extruding blown foam insulation it is important that foaming be prevented until the polymer exits the extrusion die.

Actual coating of the pipe may be accomplished using an annular crosshead die attached to the thermal insulation extruder through which the pre-heated pipe, with a prior-applied corrosion protection layer or multi-layer corrosion protection system, is conveyed, the thermal insulation thereby covering the entire surface of the pipe by virtue of the annular die forming said thermal insulation into a tubular profile around the conveyed pipe.

Alternatively, the thermal insulation may be applied by a side-wrap technique whereby the thermal insulation is extruded through a flat strip or sheet die. The thermal insulation is extruded in the form of a sheet or tape which is then wrapped around the pipe. It may be necessary to apply a number of wraps to achieve the required thermal insulation thickness and, hence, performance. The individually wrapped layers are fused together by virtue of the molten state of the material being extruded. It may also be necessary to preheat the outer surface of the previous layer to ensure proper adhesion of any subsequent layer.

The application of thermal insulation by the side-wrap technique may involve wrapping the pipe as it is simultaneously rotated and conveyed forwardly along its longitudinal axis, as described above. It may also involve the application of a pre-extruded tape using rotating heads while the pipe is conveyed longitudinally but not rotated. In this particular case, the winding angle of the thermal insulation layers can be adjusted by varying the speed of pipe movement in the longitudinal direction and/or by varying the rotational speed of the pipe or the rotating heads. The tape may be wound in successive layers at opposite winding angles to maintain neutrality of the pipe, until the required thickness has been built up. Furthermore, it may be desired that the applied layers of thermal insulation do not become joined and that they are able to slide over each other with little resistance in order to avoid increasing bend stiffness or bend dynamics.

If it is necessary to apply an adhesive layer between the corrosion protection layer, or system, and the thermal insulation layer, or between individual thermal insulation layers, this can be accomplished using either a single layer sheet or annular die, or a co-extrusion die whereby a multi-layer adhesive or the adhesive and thermal insulation layers are applied simultaneously. The outer protective topcoat, if necessary, may be similarly applied.

Pipe Joint Insulation System

The pipe joint insulation system referred to in FIG. 10 comprises a high temperature resistant thermoplastic insulation layer 13, identical or similar in composition to the thermal insulation layer, or layers, and which is bondable to the corrosion protection layer or system 15, the existing thermal insulation layer, or layers, 6, and the topcoat 7.

The pipe joint insulation system also comprises a corrosion protection layer 15, which may have a single or multi-layer structure. Preferably, the corrosion protection layer is similar or identical to the corrosion protection layers and systems described above in connection with FIGS. 1 to 4. For example, the corrosion protection layer 15 may comprise the epoxy and adhesive layers previously described, applied directly to the welded joint area of the steel pipe prior to the application of thermal insulation layer, or layers.

The pipe joint insulation is typically applied by direct extrusion injection into a mould designed to conform to the outer dimensions of the insulated pipe. The processing conditions used will be similar to those used to apply the thermal insulation layer, or layers, of similar or identical composition.

The pipe joint insulation composition may be applied either foamed or as an unfoamed solid.

EXAMPLES

The present invention is illustrated by way of the following examples and with references to FIGS. 1-10.

Example 1

In this example a steel pipe 1 is provided with a three layer corrosion protection coating as described above in connection with FIG. 1, comprising a corrosion protection layer 2, an adhesive layer 3 and a topcoat 4. The steel pipe 1, which was surface-blasted and cleaned, had an outside diameter of 140 mm and wall thickness of 10 mm. The pipe 1 was pre-heated to a temperature of 200° C. and spray-coated with a 0.300+/−0.100 mm thick layer 2 of fusion bonded high temperature epoxy powder (density 1400+/−100 g/l), followed immediately by the extrusion on top of the epoxy of a 0.300+/−0.200 mm layer 3 of a high temperature modified styrene-maleic anhydride copolymer adhesive (density 1.060 g/cm$^3$ and melt flow rate 0.6 g/10 min) and a 6.0+/−1.0 mm topcoat 4 of solid polyphenylene oxide-polystyrene blend (density 1.060 g/cm$^3$ and melt flow rate 8 g/10 min.) at melt temperatures of 220° C. and 260° C., respectively. Extrusion of adhesive layer 3 and topcoat 4 was accomplished in sequential fashion by extruding the material through individual sheet dies and wrapping said layers circumferentially around the rotating pipe. The 3-layer corrosion-protection coated pipe thus produced was cooled to room temperature and tested for the properties noted in Table 2.

Example 2

The corrosion-protected pipe produced in Example 1 was further coated with a 20.0+/−1.0 mm layer 6 of the same solid polyphenylene oxide-polystyrene blend (degree of foaming=0%) of topcoat 4 using an extruder equipped with a sheet die by preheating the outer surface of said corrosion-protected pipe to a temperature of around 220° C., and wrapping the polyphenylene oxide-polystyrene blend at a melt temperature of 260° C. on top of the preheated outer surface. The insulated pipe thus produced was tested for the properties noted in Table 3.

Example 3

Using the coating procedure described in Example 2, the corrosion protected pipe produced in Example 1 was further coated with a 30.0+/−1.0 mm layer 6 of the polyphenylene oxide-polystyrene blend of Example 1 foamed to a density of 0.945 g/cm$^3$ (degree of foaming=10%) using 0.5% by weight of an endothermic chemical foaming agent, and an outer 5.0+/−1.0 mm. layer 7 of solid high impact polystyrene modified with polyethylene (density 1.020 g/cm$^3$ and melt flow index 4.0 g/10 min.). The insulated pipe thus produced was tested for the properties noted in Table 3.

Example 4

Using the coating procedure of Example 2, the insulated pipe of Example 2 was further coated with a 30.0+/−1.0 mm layer 8 of solid high impact polystyrene (density 1.050 g/cm$^3$, degree of foaming 0%, and melt flow index 5.0 g/10 min) and an outer 5.0+/−1.0 mm. layer 7 of the solid high impact polystyrene modified with polyethylene of Example 3. The coated pipe thus produced was tested for the properties noted in Table 3.

Example 5

Using the coating procedure of Example 2, the insulated pipe of Example 2 was further coated with a 30.0+/−1.0 mm layer 8 of the high impact polystyrene of Example 4 foamed to a density of 0.900 g/cm$^3$ (degree of foaming=15%) using 0.75% by weight of an endothermic chemical foaming agent, this foamed layer being further coated with an outer 5.0+/−1.0 mm. layer 7 of solid high impact polystyrene of Example 4 modified with styrene-ethylene/butylene-styrene rubber. The coated pipe thus produced was tested for the properties noted in Table 3.

Example 6

The corrosion-protected pipe produced in Example 1 but without the modified styrene-maleic anhydride copolymer adhesive and polyphenylene oxide-polystyrene blend topcoat was coated with a 0.300+/−0.200 mm layer of high temperature maleic anhydride modified polyolefin adhesive (density 0.950 g/cm3 and melt flow index 1.0 g/10 min.), a 30.0+/−1.0 mm. layer 6 of solid polyphenylene oxide-polypropylene copolymer blend (density 0.970 g/cm3, degree of foaming of 0%, and melt flow rate 10.6 g/10 min) and a 30.0+/−1.0 mm layer 8 of polypropylene copolymer (density 0.902 g/cm3 and melt flow index 0.9 g/10 min) foamed to a density of 0.750 g/cm3 (degree of foaming=23%) using 1% by weight of an endothermic chemical foaming agent, this foamed layer being further coated with an outer 5.0+/−1.0 mm layer 7 of the solid polypropylene copolymer. The insulated pipe thus produced was tested for the properties noted in Table 3.

Example 7

The corrosion-protected pipe produced in Example 1 but without the modified styrene-maleic anhydride copolymer adhesive and polyphenylene oxide-polystyrene blend topcoat was coated with a 0.300+/−0.200 mm layer of high temperature maleic anhydride modified polyolefin adhesive (density 0.950 g/cm3, degree of foaming of 0%, and melt flow index 1.0 g/10 min.), a 30.0+/−1.0 mm. layer 6 of the solid polypropylene of Example 6 and a 30.0+/−1.0 mm layer 8 of solid polybutylene (density 0.930 g/cm3, degree of foaming of 0% and melt flow index 0.4 g/10 min). The insulated pipe thus produced was tested for the properties noted in Table 3.

Example 8

The corrosion-protected pipe produced in Example 1 but without the polyphenylene oxide-polystyrene blend topcoat was further coated with a 20.0+/−1.0 mm. layer 6 of solid polycarbonate (density 1.190 g/cm$^3$, degree of foaming of 0%, and melt flow index 3.5 g/10 min) and a 30.0+/−1.0 mm layer 8 of the same polycarbonate foamed to a density of 1.050 g/cm$^3$ (degree of foaming 12%) using 0.5% by weight of an endothermic chemical foaming agent, this foamed layer being further coated with an outer 5.0+/−1.0 mm. layer 7 of solid thermoplastic polyester elastomer (density 1.160 g/cm$^3$ and melt flow index 0.5 g/10 min.). The insulated pipe thus produced was tested for the properties noted in Table 3.

Example 9

The corrosion-protected pipe produced in Example 1 but without the polyphenylene oxide-polystyrene blend topcoat was further coated with a 30.0+/−1.0 mm layer 6 of the solid polycarbonate of Example 8, a 5 mm layer 9 of the modified styrene-maleic anhydride copolymer of Example 1, a 30.0+/−1.0 mm layer 8 of the foamed polypropylene copolymer of Example 6 and an outer 5.0+/−1.0 mm. layer 7 of the solid polypropylene copolymer of Example 6.

Example 10

Using the coating procedure of Example 2, the insulated pipe of Example 3 without the outer layer was further coated with a 30.0+/−1.0 mm layer 8 of the polyphenylene oxide-polystyrene blend of Example 1 foamed to a density of 0.850 g/cm$^3$ (degree of foaming=20%) using 0.75% by weight of an endothermic chemical foaming agent, this foamed layer being further coated with an outer 5.0+/−1.0 mm. layer 7 of the solid high impact polystyrene modified with polyethylene of Example 3. The coated pipe thus produced was tested for the properties noted in Table 3.

Example 11

Two 12 m lengths of pipe, corrosion protected and insulated as described in Example 3, were butt welded end-to-end, the insulating coating having been previously cut away from the steel at the end of each pipe to facilitate this process.

After welding, the bare metal of the weld area was coated with a fusion bonded epoxy corrosion protection layer 15 of approximate thickness 0.500+/−0.300 mm. The cavity between the epoxy coated weld joint and the outside diameter of the insulated pipe was then filled by injecting the polyphenylene oxide-polystyrene blend of the previous examples at a temperature of about 250° C. into a circular mould conforming to the outside diameter of the insulated pipe. After cooling and removing the mould casing, the moulded field joint insulation 13 thus produced was tested for the properties noted in Table 4.

TABLE 2

| PROPERTY | TEST METHOD | EXAMPLE 1 |
|---|---|---|
| SHEAR STRENGTH (Epoxy Layer 2 to Adhesive Layer 3), MPa | Internal Method | >9 |
| SHEAR STRENGTH (Adhesive Layer 3 to Topcoat 4), MPa | Internal Method | >9 |
| CATHODIC DISBONDMENT (Epoxy Layer 2 to Steel Pipe 1), mm. | CAN/CSA-Z245.20-06 12.8 | <8 mm after 30 days @ 95° C. <20 mm after 90 days @ 150° C. |

TABLE 3

| PROPERTY | TEST METHOD | EXAMPLE 2, 4, and 5 (Insulation Layer 6) | EXAMPLE 3 and 10 (Insulation Layer 6) | EXAMPLE 4 (Insulation Layer 8) | EXAMPLE 5 (Insulation Layer 8) | EXAMPLE 6 (Insulation Layer 6) |
|---|---|---|---|---|---|---|
| INSULATION TYPE | | Solid polyphenylene oxide - polystyrene blend | Foamed polyphenylene oxide - polystyrene blend | Solid high impact polystyrene | Foamed high impact polystyrene | Solid polyphenylene oxide - polypropylene copolymer blend |
| DENSITY, kg/m$^3$ | ISO 845 | 1060 | 945 | 1050 | 900 | 970 |
| THERMAL CONDUCTIVITY, W/mk | ISO 8301 | 0.180 +/− 5% | 0.165 +/− 5% | 0.160 +/− 5% | 0.140 +/− 5% | 0.200 +/− 5% |
| UNIAXIAL COMPRESSIVE STRENGTH, MPa | ISO 604.2 | 50 +/− 10 | 40 +/− 10 | 30 +/− 10 | 20 +/− 10 | 50 +/− 10 |
| TRIAXIAL COMPRESSIVE MODULUS at 90° C., MPa | InSpec 1-1-4-140/SP01 | >2,000 | >1,600 | >1,500 | >1000 | >1,500 |
| TRIAXIAL COMPRESSIVE CREEP RESISTANCE, % after 20 years at 90° C. and 5 Mpa. | InSpec 1-1-4-140/SP01 | <1.5 | <4 | <1.5 | <2.5 | <1.5 |

TABLE 3-continued

| PROPERTY | TEST METHOD | | | | | | |
|---|---|---|---|---|---|---|---|
| FLEXURAL MODULUS at 2% deflection, MPa | ISO 178 | 2,500 +/− 200 | 2,100 +/− 200 | 1600 +/− 200 | 1300 +/− 200 | 1600 +/− 200 | |

| PROPERTY | TEST METHOD | EXAMPLE 6 and 9 (Insulation Layer 8) | EXAMPLE 7 (Insulation Layer 6) | EXAMPLE 7 (Insulation Layer 8) | EXAMPLE 8 and 9 (Insulation Layer 6) | EXAMPLE 8 (Insulation Layer 8) | EXAMPLE 10 (Insulation Layer 8) |
|---|---|---|---|---|---|---|---|
| INSULATION TYPE | | Foamed polypropylene copolymer | Solid polypropylene copolymer | Solid polybutylene | Solid polycarbonate | Foamed polycarbonate | Foamed polyphenylene oxide - polystyrene blend |
| DENSITY, kg/m$^3$ | ISO 845 | 750 | 900 | 930 | 1200 | 1050 | 850 |
| THERMAL CONDUCTIVITY, W/mk | ISO 8301 | 0.180 +/− 5% | 0.220 +/− 5% | 0.190 +/− 5% | 0.190 +/− 5% | 0.170 +/− 5% | 0.150 +/− 5% |
| UNIAXIAL COMPRESSIVE STRENGTH, MPa | ISO 604.2 | 15 +/− 5 | 30 +/− 10 | 30 +/− 10 | 80 +/− 10 | 60 +/− 10 | 30 +/− 10 |
| TRIAXIAL COMPRESSIVE MODULUS at 90° C., MPa | InSpec 1-1-4-140/SP01 | >500 | >700 | >400 | >2,000 | >1,200 | >1,200 |
| TRIAXIAL COMPRESSIVE CREEP RESISTANCE, % after 20 years at 90° C. and 5 Mpa. | InSpec 1-1-4-140/SP01 | <10 | <2 | <2 | <1.5 | <5 | <7 |
| FLEXURAL MODULUS at 2% deflection, MPa | ISO 178 | 800 +/− 100 | 1100 +/− 100 | 650 +/− 100 | 2,300 +/− 200 | 1,900 +/− 200 | 1,700 +/− 200 |

TABLE 4

| PROPERTY | TEST METHOD | EXAMPLE 9 |
|---|---|---|
| THERMAL CONDUCTIVITY (Insulation 13), W/mK | ISO 8301 | 0.180 +/− 5% |
| SHEAR STRENGTH (Insulation 13 to Insulation Layer 6), MPa. | ISO 527-2 | >12 |
| SHEAR STRENGTH (Insulation 13 to Corrosion Protection Layer 15), MPa | Internal Method | >5 |
| CATHODIC DISBONDMENT (Corrosion Protection Layer 15 to Steel Pipe 1), mm | CAN/CSA-Z245.20-06 12.8 | <8 mm after 30 days @ 95° C. <20 mm after 90 days @ 150° C. |

What is claimed is:

1. An insulated high-temperature transport conduit for use in offshore, deep water environments, the conduit comprising:
   (a) a continuous steel pipe made up of one or more pipe sections, wherein the steel pipe has an outer surface and an inner surface; and
   (b) a first layer of thermal insulation provided over the outer surface of the steel pipe, wherein the first layer of thermal insulation is comprised of a high temperature resistant thermoplastic having low thermal conductivity, high thermal softening point, high compressive strength and high compressive creep resistance;
   wherein the high temperature resistant thermoplastic has a Vicat softening point in the range from 130-200° C. and a thermal conductivity of from 0.15-0.20 W/mK.

2. The insulated high-temperature transport conduit according to claim 1, wherein the first thermal insulation layer is solid.

3. An insulated high-temperature transport conduit for use in offshore, deep water environments, the conduit comprising:
   (a) a continuous steel pipe made up of one or more pipe sections, wherein the steel pipe has an outer surface and an inner surface; and
   (b) a first layer of thermal insulation provided over the outer surface of the steel pipe, wherein the first layer of thermal insulation is comprised of a high temperature resistant thermoplastic having low thermal conductivity, high thermal softening point, high compressive strength and high compressive creep resistance;

wherein the first thermal insulation layer is a blown foam or a syntactic foam having a degree of foaming of up to about 50%.

4. The insulated high-temperature transport conduit according to claim 3, wherein the degree of foaming of the first thermal insulation layer is from 5-30%.

5. The insulated high-temperature transport conduit according to claim 4, wherein the degree of foaming of the first thermal insulation layer is from 10-25%.

6. The insulated high-temperature transport conduit according to claim 1, wherein the first thermal insulation layer has one or more of the following properties:
   high compressive creep resistance at higher temperatures (<7% triaxial);
   high compressive modulus (>1000 MPa);
   high compressive strength (>25 MPa, uniaxial);
   low thermal conductivity (<0.200 W/mK);
   high, long term temperature withstand capability (>130° C.).

7. The insulated high-temperature transport conduit according to claim 6, wherein the first thermal insulation layer has all of said properties.

8. The insulated high-temperature transport conduit according to claim 1, wherein the high temperature resistant thermoplastic is selected from one or more members of the group comprising: polycarbonate; polyphenylene oxide; polyphenylene oxide blended with polypropylene, polystyrene or polyamide; polycarbonate blended with polybutylene terephthalate, polyethylene terephthalate, acrylonitrile butadiene styrene, acrylonitrile styrene acrylate, or polyetherimide; polyamides, including polyamide 12 and 612 and elastomers thereof; polymethylpentene and blends thereof; cyclic olefin copolymers and blends thereof; and, partially crosslinked thermoplastic elastomers, also known as thermoplastic vulcanizates or dynamically vulcanized elastomers.

9. The insulated high-temperature transport conduit according to claim 8, wherein the high temperature resistant thermoplastic is selected from the group comprising polyphenylene oxide and polyphenylene oxide blended with polypropylene, polystyrene or polyamide.

10. The insulated high-temperature transport conduit according to claim 9, wherein the high temperature resistant thermoplastic is selected from the group comprising blends of polyphenylene oxide with polystyrene, and polyphenylene oxide-polypropylene.

11. The insulated high-temperature transport conduit according to claim 8, wherein the high temperature resistant thermoplastic is selected from the group comprising polycarbonate and polycarbonate blended with polybutylene terephthalate, polyethylene terephthalate, acrylonitrile butadiene styrene, acrylonitrile styrene acrylate, or polyetherimide.

12. The insulated high-temperature transport conduit according to claim 1, further comprising a corrosion protection coating directly applied to the outer surface of the steel pipe and bonded thereto, and underlying the first thermal insulation layer.

13. The insulated high-temperature transport conduit according to claim 12, wherein the corrosion protection coating comprises a layer of cured epoxy or modified epoxy.

14. The insulated high-temperature transport conduit according to claim 12, wherein the corrosion protection coating comprises an epoxy phenolic, a styrene-maleic anhydride copolymer such as a styrene-maleic anhydride copolymer blended with acrylonitrile-butadiene-styrene (ABS), polyphenylene sulphide, polyphenylene oxide or polyimide, including modified versions and blends thereof.

15. An insulated high-temperature transport conduit for use in offshore, deep water environments, the conduit comprising:
   (a) a continuous steel pipe made up of one or more pipe sections, wherein the steel pipe has an outer surface and an inner surface; and
   (b) a first layer of thermal insulation provided over the outer surface of the steel pipe, wherein the first layer of thermal insulation is comprised of a high temperature resistant thermoplastic having low thermal conductivity, high thermal softening point, high compressive strength and high compressive creep resistance;
   further comprising a corrosion protection coating directly applied to the outer surface of the steel pipe and bonded thereto, and underlying the first thermal insulation layer;
   wherein the first thermal insulation layer is in direct contact with the corrosion protection coating and directly adhered thereto, the corrosion protection coating having been treated by plasma or corona discharge prior to application of the first thermal insulation layer.

16. An insulated high-temperature transport conduit for use in offshore, deep water environments, the conduit comprising:
   (a) a continuous steel pipe made up of one or more pipe sections, wherein the steel pipe has an outer surface and an inner surface; and
   (b) a first layer of thermal insulation provided over the outer surface of the steel pipe, wherein the first layer of thermal insulation is comprised of a high temperature resistant thermoplastic having low thermal conductivity, high thermal softening point, high compressive strength and high compressive creep resistance;
   further comprising a corrosion protection coating directly applied to the outer surface of the steel pipe and bonded thereto, and underlying the first thermal insulation layer;
   wherein the corrosion protection coating comprises a multi-layer corrosion protection system applied to the outer surface of the steel pipe and underlying the first thermal insulation layer, wherein the multi-layer corrosion protection system comprises:
      (a) a layer of said cured epoxy or modified epoxy directly applied to the outer surface of the steel pipe and bonded thereto; and
      (b) a first adhesive layer applied directly to the corrosion protection layer and underlying the first thermal insulation layer.

17. The insulated high-temperature transport conduit according to claim 16, wherein the adhesive layer is comprised of a polymer provided with functional groups and having a mutual affinity for the corrosion protection layer and the first thermal insulation layer.

18. The insulated high-temperature transport conduit according to claim 16, wherein the first thermal insulation layer is in direct contact with the first adhesive layer and is bonded thereto.

19. The insulated high-temperature transport conduit according to claim 16, wherein the multi-layer corrosion protection system further comprises:
   (c) a first protective topcoat comprised of an unfoamed polymeric material in direct contact with the first adhesive layer and bonded thereto, wherein the first thermal insulation layer is in direct contact with the first protective topcoat and bonded thereto.

20. The insulated high-temperature transport conduit according to claim 1, wherein the corrosion protection coating comprises a single-layer composite corrosion protection coating directly applied to the outer surface of the steel pipe and bonded thereto and in direct contact with the first thermal insulation layer, wherein the single-layer composite corrosion protection coating comprises a cured epoxy resin, an adhesive and an unfoamed polymeric material.

21. The insulated high-temperature transport conduit according to claim 1, further comprising an outer protective topcoat applied over the first thermal insulation layer and forming an outer surface of the insulated transport conduit, wherein the outer protective topcoat is comprised of an unfoamed polymeric material.

22. An insulated high-temperature transport conduit for use in offshore, deep water environments, the conduit comprising:
   (a) a continuous steel pipe made up of one or more pipe sections, wherein the steel pipe has an outer surface and an inner surface; and
   (b) a first layer of thermal insulation provided over the outer surface of the steel pipe, wherein the first layer of thermal insulation is comprised of a high temperature resistant thermoplastic having low thermal conductivity, high thermal softening point, high compressive strength and high compressive creep resistance;
   further comprising an outer protective topcoat applied over the first thermal insulation layer and forming an outer surface of the insulated transport conduit, wherein the outer protective topcoat is comprised of an unfoamed polymeric material;
   wherein the first thermal insulation layer is in direct contact with the outer protective topcoat and directly adhered thereto, the first thermal insulation layer having been treated by plasma or corona discharge prior to application of the outer protective topcoat.

23. The insulated high-temperature transport conduit according to claim 1, further comprising a second thermal insulation layer comprised of a thermoplastic in the form of a solid, a blown foam or a syntactic foam.

24. The insulated high-temperature transport conduit according to claim 23, wherein the second thermal insulation layer is comprised of a polymeric material which is dissimilar to the high temperature resistant thermoplastic comprising the first thermal insulation layer.

25. The insulated high-temperature transport conduit according to claim 24, wherein the dissimilar polymeric material is selected from one or more members of the group comprising: solid or foamed polypropylene homopolymer or copolymer, polybutylene, polyethylene; polystyrene, high impact polystyrene, modified polystyrene, and crosslinked or partially crosslinked polypropylene and polyethylenes, including copolymers, blends and elastomers thereof; and
   wherein the first thermal insulation layer underlies the second thermal insulation layer.

26. An insulated high-temperature transport conduit for use in offshore, deep water environments, the conduit comprising:
   (a) a continuous steel pipe made up of one or more pipe sections, wherein the steel pipe has an outer surface and an inner surface; and
   (b) a first layer of thermal insulation provided over the outer surface of the steel pipe, wherein the first layer of thermal insulation is comprised of a high temperature resistant thermoplastic having low thermal conductivity, high thermal softening point, high compressive strength and high compressive creep resistance;
   further comprising a second thermal insulation layer comprised of a thermoplastic in the form of a solid, a blown foam or a syntactic foam;
   wherein the first and second thermal insulation layers are foamed to different degrees.

27. The insulated high-temperature transport conduit according to claim 26, wherein the first thermal insulation layer underlies the second thermal insulation layer, and wherein the second thermal insulation layer is foamed to a greater degree than the first thermal insulation layer.

28. An insulated high-temperature transport conduit for use in offshore, deep water environments, the conduit comprising:
   (a) a continuous steel pipe made up of one or more pipe sections, wherein the steel pipe has an outer surface and an inner surface; and
   (b) a first layer of thermal insulation provided over the outer surface of the steel pipe, wherein the first layer of thermal insulation is comprised of a high temperature resistant thermoplastic having low thermal conductivity, high thermal softening point, high compressive strength and high compressive creep resistance;
   further comprising a second thermal insulation layer comprised of a thermoplastic in the form of a solid, a blown foam or a syntactic foam;
   wherein the first thermal insulation layer underlies the second thermal insulation layer, and is in direct contact with the second thermal insulation layer and directly adhered thereto, the first thermal insulation layer having been treated by plasma or corona discharge prior to application of the second thermal insulation layer.

29. An insulated high-temperature transport conduit for use in offshore, deep water environments, the conduit comprising:
   (a) a continuous steel pipe made up of one or more pipe sections, wherein the steel pipe has an outer surface and an inner surface; and
   (b) a first layer of thermal insulation provided over the outer surface of the steel pipe, wherein the first layer of thermal insulation is comprised of a high temperature resistant thermoplastic having low thermal conductivity, high thermal softening point, high compressive strength and high compressive creep resistance;
   further comprising a second thermal insulation layer comprised of a thermoplastic in the form of a solid, a blown foam or a syntactic foam;
   wherein the first and second thermal insulation layers are separated by a layer of unfoamed polymeric material.

30. The insulated high-temperature transport conduit according to claim 29, wherein interlayer adhesion is provided between the layer of unfoamed polymeric material and the first and second thermal insulation layers by treating the first thermal insulation layer with plasma or corona discharge prior to application of the layer of unfoamed polymeric material, and by plasma or corona discharge of the layer of unfoamed polymeric material prior to application of the second thermal insulation layer.

31. The insulated high-temperature transport conduit according to claim 29, wherein an adhesive layer is provided between the layer of unfoamed polymeric material and one or both of the first and second thermal insulation layers.

32. The insulated high-temperature transport conduit according to claim 29, wherein the unfoamed polymeric material is an adhesive.

33. An insulated high-temperature transport conduit for use in offshore, deep water environments, the conduit comprising:
   (a) a continuous steel pipe made up of one or more pipe sections, wherein the steel pipe has an outer surface and an inner surface; and (b) a first layer of thermal insulation provided over the outer surface of the steel pipe, wherein the first layer of thermal insulation is comprised of a high temperature resistant thermoplastic having low thermal conductivity, high thermal softening point, high compressive strength and high compressive creep resistance;

further comprising a moulded pipe joint insulation system directly bonded to both the corrosion protection coating system and first thermal insulation layer at a joint connecting two pipe sections.

34. The insulated high-temperature transport conduit according to claim 33, wherein the moulded pipe joint insulation system is comprised of said high temperature resistant thermoplastic.

* * * * *